United States Patent
Hohenadel

(10) Patent No.: US 10,099,455 B1
(45) Date of Patent: Oct. 16, 2018

(54) MULTIFACETED COATING SYSTEM

(75) Inventor: Amy Hohenadel, Kansas City, MO (US)

(73) Assignee: Polymeric Ireland, LTD, Durban (ZA)

( * ) Notice: Subject to any disclaimer, the term of this patent is extended or adjusted under 35 U.S.C. 154(b) by 705 days.

(21) Appl. No.: 13/462,565

(22) Filed: May 2, 2012

Related U.S. Application Data

(60) Provisional application No. 61/481,446, filed on May 2, 2011.

(51) Int. Cl.
*B32B 27/10* (2006.01)
*C09D 5/18* (2006.01)

(52) U.S. Cl.
CPC .............. *B32B 27/10* (2013.01); *C09D 5/185* (2013.01)

(58) Field of Classification Search
CPC .................................................. B32B 27/10
See application file for complete search history.

(56) References Cited

U.S. PATENT DOCUMENTS

| | | | |
|---|---|---|---|
| 6,558,753 B1 * | 5/2003 | Ylitalo | C09D 11/36 427/466 |
| 6,733,697 B2 | 5/2004 | Rhodes et al. | |
| 7,579,388 B2 | 8/2009 | Kiefer | |
| 7,736,560 B2 | 6/2010 | Nelson | |
| 2004/0012004 A1 | 1/2004 | Rhodes et al. | |
| 2004/0036061 A1 | 2/2004 | Rhodes et al. | |
| 2006/0068133 A1 * | 3/2006 | Khoultchaev et al. | 428/32.34 |
| 2006/0151758 A1 | 7/2006 | Reyes | |
| 2006/0246149 A1 * | 11/2006 | Buchholz et al. | 424/603 |
| 2009/0012198 A1 * | 1/2009 | Araumi et al. | 522/35 |
| 2010/0076098 A1 | 3/2010 | Mabey et al. | |
| 2010/0294425 A1 * | 11/2010 | Karan | B31D 1/02 156/253 |
| 2011/0130491 A1 * | 6/2011 | Fukushima et al. | 524/100 |
| 2012/0142815 A1 * | 6/2012 | Mirante | C08L 33/14 523/218 |

FOREIGN PATENT DOCUMENTS

| | | | |
|---|---|---|---|
| JP | 2009138117 A | * | 6/2009 |
| WO | WO 2010013400 A1 | * | 2/2010 |

OTHER PUBLICATIONS

Machine translation of JP2009138117A.*
"The Importance of Viscosity in Printing Ink Systems," Richard Podhajny, Paper Film and Foil Converter, May 1998.*

* cited by examiner

*Primary Examiner* — Ian A Rummel

(74) *Attorney, Agent, or Firm* — Husch Blackwell LLP

(57) ABSTRACT

A protective coating system that exhibits a plurality of highly desirable characteristics, such as broad range adhesion, fire retardancy, anti-microbial, anti-graffiti, and solvent resistance, is provided. The coating composition generally includes a urethane resin, mono and multifunctional monomers, a reactive diluent, and fire-retardant and antimicrobial agents. The coating compositions are particularly suited for use with wallpaper and other paper and plastic products, especially those having images printed thereon.

19 Claims, No Drawings

MULTIFACETED COATING SYSTEM

RELATED APPLICATION

This application claims the benefit of U.S. Provisional Patent Application No. 61/481,446, filed May 2, 2011, which is incorporated by reference herein in its entirety.

BACKGROUND OF THE INVENTION

Field of the Invention

The present invention, generally, is directed toward a protective coating system for application to a wide variety of surfaces. The coating system comprises a unique chemistry that enables the cured coating to exhibit a number of interdependent properties, among which are fire-retardancy, broad range adhesion, anti-graffiti and antimicrobial activity, and resistance to acetone, alcohol, and other solvents. Particularly, the coating composition comprises a urethane resin, mono and multifunctional monomers and a reactive diluent into which fire-retardant and antimicrobial agents are added. The coating compositions are particularly suited for use with wallpaper and other vinyls, rigid and flexible plastics, and coated boardstocks, especially those having images printed thereon.

Description of the Prior Art

Many common consumer articles are made from materials that under the right conditions are quite combustible. Such items can be made from natural materials, such as wood fibers in the case of paper products, or synthetic resin materials, such as plastics, vinyls and the like. These items, particularly when used or placed within closed environments such as homes and vehicles can greatly accelerate the spread of fire through that environment. As an example of the tragic results that can occur as a result of these items catching fire, a January 2000 fire at Seton Hall University in New Jersey drew attention to the perils of fire on college campuses. A common area in a Seton Hall dorm caught fire after two students ignited a banner from a bulletin board. The fire quickly spread to furniture and killed three students and injured 58 others.

Coating these combustible articles with fire retardants has been employed as a means to prevent such articles from catching on fire or slowing down the fire if it does start. Had the banner from the Seton Hall dorm been coated with such a protective coating, this tragedy may have been averted.

However, the current fire-retardant coating systems available have shortcomings in that they do not exhibit strong performance characteristics in other areas that would provide a broad consumer appeal. For example, these conventional coatings do not adhere well to a wide variety of substrates, nor do they tend to resist staining or degradation by solvents. This latter feature is especially important as coated articles must often be cleaned with sanitizing compositions to inhibit the spread of bacteria and other pathogens. Thus, even routine cleaning could adversely affect the coating's ability to protect a particular article. Furthermore, many of these coating materials utilize antimony and halogens, such as bromine, which can present human health and shipping hazards.

SUMMARY OF THE INVENTION

In one embodiment according to the present invention, there is provided a multi-faceted coating system exhibiting many highly beneficial and sought after characteristics. For example, the coating system exhibits excellent fire-retardant and antimicrobial characteristics, along with anti-graffiti, broad range adherence, and solvent resistance characteristics. The coating systems comprise one or more urethane resins, one or more monofunctional monomers, one or more di- or multifunctional monomers, a reactive diluent, a fire-retardant additive, and an antimicrobial agent.

In another embodiment according to the present invention, there is provided an article having at least a portion of an outer surface thereof coated with a coating system as described herein. In particular embodiments, the article comprising the coating thereon is a pliable or flexible sheet material or film, such as wallpaper. In other embodiments, the article can be formed from a rigid material such as paper board, poster board, card board, or plastic. Specifically, the coating is a clear coat that can be applied over the top of any printed surface. Further exemplary articles to which the coating may be applied include game boards, greeting cards, advertising literature, posters, and the like.

In yet another embodiment according to the present invention there is provided a method of forming a protective coating on an article. The method includes the step of applying to at least a portion of the surface of the article a coating composition as described herein. The coating composition is then cured on the surface of the article to form a protective layer.

DETAILED DESCRIPTION OF THE PREFERRED EMBODIMENT

Coating compositions according to the present invention generally exhibit both fire-retardant and antimicrobial characteristics while also providing excellent adherence to a wide variety of substrates, and solvent and stain resistance. According to one embodiment of the present invention, the coating composition comprises one or more urethane resins. The urethane resin can be oligomeric or polymeric in nature. In one particular embodiment, the aliphatic urethane resin comprises a polyester-based aliphatic urethane resin, such as CN 991 aliphatic urethane resin from Sartomer. In other embodiments, when weatherability is not a concern, the urethane resin may comprise an aromatic urethane resin, such as CN 992 from Sartomer. Other difunctional or multifunctional aliphatic urethanes may also be acceptable. Additional urethane resins for use with the present invention include aliphatic urethanes, acrylic-based urethanes, urethane acrylates, and epoxy-based urethanes. However, oligomers with a higher crosslink density may limit the final flexibility of the cured coating.

The coating compositions also comprise one or more monofunctional monomers. In particular embodiments, the monofunctional monomer is a monofunctional acrylate monomer, such as isobornyl acrylate (IBOA), e.g., SR506A from Sartomer. Other exemplary monofunctional monomers that may be used with the present invention include 2-phenoxyethyl acrylate (2-PEA), ethyl methacrylate, butyl methacrylate, methyl methacrylate or any combination thereof. Still further monofunctional monomers that may be used with the present invention include cycloaliphatic acrylate monomers (e.g., SR 217 from Sartomer), cyclic trimethylol formal acrylate (e.g., SR 531 from Sartomer), 2-(2-Ethoxyethoxy)ethyl acrylate (EOEOEA), vinylcaprolactam, and CD420 from Sartomer. In certain embodiments according to the present invention, the mono-functional monomer has a molecular weight that ranges from about 100 g/mole to about 600 g/mole.

The coating compositions also comprise one or more multifunctional monomers. As used herein, the term "multifunctional monomer" refers to a monomer having more than one polymerizable functional group and includes, without limitation, difunctional and trifunctional monomers. In particular embodiments, the multifunctional monomer is a difunctional monomer. Still more particularly, the difunctional monomer is a difunctional acrylate monomer, such as dipropylene glycol diacrylate (DPGDA), or alkoxylated aliphatic diacrylate (e.g. SR 9209A from Sartomer). Other exemplary multifunctional monomers include tricyclododecan dimethanol diacrylate (e.g., SR 833S from Sartomer), hexanediol diacrylate (HDODA), neopentyl glycol diacrylate (NPGDA), proproxylated NPGDA (e.g., SR 9003IJ from Sartomer), and tripropylene glycol diacrylate (TPGDA).

In certain embodiments, the coating composition further includes a reactive diluent. In particular embodiments, the reactive diluent comprises a vinyl-based monomer such as vinyl pyrrolidone, or vinyl caprolactam.

Compositions according to the present invention comprise a fire-retardant material, particularly an intumescent fire retardant. An intumescent fire retardant refers to a substance that swells as a result of heat exposure, thus increasing in volume, and decreasing in density which acts as a passive fire deterrent.

Intumescent fire retardants can be "activated" or "unactivated." An activated flame or fire retardant material generally provides improved flame retardancy through incorporation of at least one activator, char forming catalyst or phase transfer catalyst. Specifically, activated flame retardants impart improved char yield, including faster char generation and/or higher char quality, char density, self-extinguishing characteristics, thermal insulation, and/or lower smoke emissions.

In certain embodiments according to the present invention, the fire-retardant agent may comprise one or more of the following additives: a phosphorus-containing additive whose purpose is forming, during the combustion, an impermeable, semi-solid vitreous layer, constituted by polyphosphoric acid, and activating the process of formation of intumescence; a nitrogen-containing additive that functions as a foaming agent; and a carbon-containing additive that acts as a carbon donor to allow an insulating cellular carbonaceous layer ("char") to be formed. Phosphates that release phosphoric acid at high temperature may also be employed.

In other embodiments according to the present invention, the flame retardant may be an activated flame retardant comprising at least one nitrogenous phosphorus and/or sulfonate and at least one activator. The activator may include a char forming catalyst and/or a phase transfer catalyst. More specifically, the activated flame retardant may include an activated nitrogenous phosphate flame retardant including the reaction product of: at least one nitrogen-containing reactant and at least one phosphorus-containing reactant capable of forming nitrogenous phosphate component, in the presence of at least one char forming tetraoxaspiro catalyst.

In other embodiments according to the present invention, the intumescent flame retardant is selected from the group consisting of activated melamine pyrophosphates, activated melamine polyphosphates, activated ethylene diamine phosphate, activated ammonium polyphosphate, melamine, melamine phosphate, unactivated melamine pyrophosphates, unactivated melamine polyphosphate, melamine cyanurates and blends thereof. In particular embodiments, the fire-retardant materials are free flowing white powders with nominal particle sizes in the range of 3-20 microns, and especially in the range of 3-5 microns. They have a high purity of 98% or higher, possess outstanding char forming capabilities, and have a specific gravity of approximately 1.2.

In still other embodiments, the fire-retardant material comprises a phosphate-based flame-retardant material having little to no halogen content. In particular embodiments, the fire-retardant material is non-halogenated. Through the use of phosphate-based fire-retardant materials, use of hazardous antimony and bromine-containing materials is avoided. Thus, certain embodiments according to the present invention do not include antimony, bromine, or other halogens.

Exemplary fire retardant compositions are described in U.S. Pat. Nos. 7,736,560 and 6,733,697; U.S. Patent Application Publication Nos. 2004/0036061 and 2004/0012004, all of which are incorporated by reference herein in their entireties. Commercially available fire retardant materials include CEASEFIRE products (Cote-1 Industries, Teaneck, N.J.) and INTUMAX products (Broadview Technologies, Newark, N.J.).

The coating composition also comprises one or more antimicrobial agents. Generally, any antimicrobial agent may be used with the coating compositions described herein. However, certain embodiments of the present invention utilize silver-based antimicrobial agents. Such silver-based antimicrobial agents may comprise metallic silver (i.e., zero valence atoms) or silver ions. Exemplary silver-based antimicrobial agents include Ionpure™, a soluble glass containing antimicrobial silver ions, available from Ishizuka Glass, Iwakura-shi, Japan, Biomaster™ from Addmaster (UK) Ltd., Agion from Agion Technologies, Wakefield, Mass., and BASF Iraguard B Silver. In certain embodiments, the antimicrobial agent is provided as a solid, particularly a powder that can be dispersed or suspended in the basic dispersion. As explained further below, depending upon the desired end use for the coating composition, particle size selection for the antimicrobial agent can be important. In certain embodiments, the particle size of the antimicrobial agent is less than 10 microns, between about 0.1 to about 10 microns, or between about 1 to about 5 microns.

In certain embodiments, the coating composition is UV-curable. In those compositions, a photoinitiator may be utilized to initiate cross-linking of the various monomers and/or resins. Since certain embodiments of the present invention are provided as a clear coating, it is preferred that the photoinitiator will be a non-yellowing initiator. Exemplary photoinitiators suitable for use with the present invention include Irgacure® 184 (1-hydroxycyclohexyl phenyl ketone), TPO (2,4,6-trimethylbenzoylphenylphosphineoxide), 2-methyl-1-[4-(methylthio)phenyl]-2-(4-morpholinyl)-1-propanone (Irgacure® 907), Bis-Acyl-Phosphine Oxide (BAPO, Irgacure® 819), and benzophenone and derivatives thereof such as Ebercryl P39, Esacure® ONE (difunctional α-hydroxy ketone).

In certain embodiments, the coating composition may include inert acrylic resins, such as B-890 from DSM Neoresins, to enhance adhesion. Others exemplary acrylic resins that may used include BR-115, MB 2823, MB 2594, and MB 7022 from Dianal, butyl methacrylate blends such as ELVACITE 2046 (a high molecular weight (165,000) iso-butyl/n-butyl methacrylate co-polymer) from Lucite International, and methylmethacrylate blends.

The coating composition may further include one or more optional additives. These optional additives can comprise one or more solvents, anti-foaming agents, flow or other rheology control agents, oils, plasticizers, binders, antioxidants, photoinitiator stabilizers, fungicides, bactericides, organic and/or inorganic filler particles, leveling agents, opacifiers, antistatic agents, dispersants, flatting agents, or combination thereof.

In certain embodiments, the compositions according to the present invention have low VOC contents. While in many instances, it is most desirable to avoid the use of solvents, in certain embodiments, in order to control the viscosity of the coating composition, low levels of organic solvents may be employed. In these embodiments, the VOC levels are generally less than 5% by weight, or less than 1% by weight, or less than 0.1% by weight. Generally, the target viscosity of coating compositions according to the present invention is between about 200 to about 400 cps, measured at 25° C. using a Brookfield viscometer. However, it is within the scope of the present invention for the coating compositions to be solvent-based (rather than UV curable) or to comprise some solvent. In one embodiment, the coating composition is UV curable and comprises low levels of a solvent such as propylene glycol monomethyl ether acetate (PM acetate) or an alcohol such as ethyl alcohol. In this embodiment, the solvent is present at a level of less than 5% by weight.

In certain embodiments according to the present invention, the coating compositions exhibit excellent weatherability and water-resistance characteristics. A xenon-arc weatherometer can be used to test the weatherability characteristics of the coating systems according to ASTM D4459, incorporated by reference herein. Generally, the coatings can undergo at least one year of simulated weathering with only minimal or no yellowing or discoloration or change in gloss that is discernible to the naked eye. For certain embodiments of the coating composition, when applied and cured upon a polycarbonate or a vinyl substrate, the coated substrate (at least 0.5 mil thick layer) is capable of being immersed in water at ambient temperature for 96 hours without any signs of blistering visible to the naked eye.

In certain embodiments, coating compositions according to the present invention have excellent adhesion characteristics as determined by ASTM D3359-08 Standard Test Methods for Measuring Adhesion by Tape Test. Generally, this test method involves applying a layer of the coating to a particular substrate, creating a lattice pattern of cuts in the cured coating, applying a pressure-sensitive tape over the lattice, and removing the lattice. Performance is then judged by how much, if any, of the coating was removed from the lattice by the tape. In particular embodiments according to the present invention, less than 5% of the coating is removed by the tape, and more preferably, none of the coating is removed by the tape. In this particular test, the coating is deposited on the substrate to form a film of at least 0.5 mil thick. The substrate used in the adhesion test may vary from rigid plastic substrates like polyethylene, polycarbonate, corrugated polyethylene, flexible vinyl films such as those used for vehicle wraps, and metallic substrates. It is noted that for the purposes of the physical performance tests described herein (e.g., various adhesion and resistance tests), a pigment, dye or other colorant may be added to the coating composition to aid visual inspect of the coating's performance.

In certain embodiments according to the present invention, the coating systems also exhibit excellent impact resistance, particularly as measured by ASTM D2794, incorporated by reference herein. In this test, a panel containing a coating layer (at least 0.5 mil thick) is placed beneath a vertical guide tube down which falls a weight fitted with a handle which protrudes through a vertical slot in the tube. A graduated inch-pound scale is marked along the length of the tube. The weight is raised to a certain level on the graduated tube and dropped onto the panel. The weight can be dropped onto either the coated side or the reverse side of the test panel, although impact on the reverse side general is the more severe test. The coated panel is inspected for cracking. Certain coating systems according to the present invention, when cured on a substrate, do not exhibit cracking visible to the naked eye after a weight is dropped from the 180 inch-pound graduation, even when dropped onto the reverse side of the test panel.

In one aspect, the coating composition is a clear coat (i.e., pigment-free) that is capable of being applied over a substrate which may comprise an image or other base coating. The coating composition strongly adheres to many types of surfaces including both natural and synthetic materials. In one embodiment, the coating composition may be applied to synthetic resin materials such as polyolefins including polyethylene and HDPE, fluted polyolefins such as fluted polyethylene available under the name COROPLAST, polycarbonate, acrylonitrile-butadiene-styrene (ABS), PETG, rigid vinyl, pressure sensitive vinyl, vinyl films, acrylics, coated and uncoated paper, top-coated and print-treated polyesters, polystyrene, polyethylene coated card stock, PVC, expanded foam PVC such as Sintra®, Celtec®, and foam board. The coating may also be applied to natural and synthetic textile materials. The coating can also adhere to metallic surfaces and glass, although, these materials do not present the same combustibility characteristics as paper or plastic materials.

The coating also exhibits germicidal properties due to the incorporation of an antimicrobial agent therein. The germicidal properties of the coating composition make it particularly suited for use in applications where sanitary conditions are highly desirable such as in restaurants, hospitals, schools, food and beverage processing facilities, vehicle interiors (aircraft, automotive, train, etc.). In these applications, the coating composition may be applied to walls, food handling surfaces, interior moldings, and the like. The coating compositions are particularly suited for hindering the growth of or eliminating one or more, and in some embodiments all, of the following pathogens: *K. pneumoniae*, Methicillin Resistant *S. aureus* (MRSA), *Clostridium difficile, S. epidermidis, A. baumannii, C. albicans, E. coli, P. aeruginosa, S. aureus, Enterococcus* spp. (e.g., Vancomycin Resistant *Enterococcus faecalis* (VRE)), *Candida* spp., and CoNS. In particular embodiments, the coating composition is able to provide greater than a 3-log reduction in the levels of at least one, and preferably all, of the foregoing pathogens when tested according to Japanese Industrial Standard (JIS) Z 2801, incorporated by reference herein. In yet other embodiments, the coating composition is able to provide greater than a 4-log reduction, or even greater than a 5-log reduction, in one or more of the foregoing pathogens. In addition, certain embodiments of the present invention have also demonstrated the ability to hinder the growth of or eliminate certain types of mold.

In certain embodiments of the present invention, the coating is applied to a particular substrate at a thickness of about 0.1 to about 5.0 mils, or between about 0.2 to about 3.0 mils, or between about 0.3 to about 1 mil, or between about 0.4 to about 0.6 mil. Generally, the larger the coating thickness used, the larger particle size of the antimicrobial agent used. In certain embodiments, the antimicrobial agent exhibits an average particle size (i.e., the average of the particle's dimensions) that is greater than the thickness of the surrounding coating. In particular embodiments, the antimicrobial agent exhibits an average particle size that is at least 5% greater, or at least 10% greater, or at least 25% greater than the thickness of the surrounding coating. When viewed under a microscope, this feature causes the coating surface to acquire a "rocky" or uneven texture. Again, this irregular surface topography causes an increase in the total surface area of the antimicrobial agent that is exposed and available for contact with microbes to be controlled or killed.

Coating compositions according to the present invention exhibit excellent flame-retardant characteristics. Flame retardancy can be measured according to several standardized tests. In one such test, NFPA 701, incorporated by reference herein, the coated the material is hung vertically and subject to flame for 12 seconds. The specimen passes if it self-extinguishes within two seconds once the ignition source is removed, the char length is less than 6.5 inches and it does not continue to burn after reaching the floor of the test chamber.

In another flame retardancy test method, the coating composition is applied to wallpaper stock using a #2 K-bar (approximately 0.48 mil film thickness). The coating is cured by exposure to UV light under the following minimum curing parameters: 156 mJ and 558 mW. The material is held horizontally over a propane torch whose flame is permitted to come into direct contact with the coating for 10 seconds. Once the torch is removed, the amount of time in seconds that is necessary for the coating to extinguish the flame is measured. The coating passes the test if the flame is extinguished in less than 5 seconds. In certain embodiments, the coating extinguishes the flame in less than 2 seconds.

In another flame retardancy test, the dripping of burning or charred particulates from the substrate is observed. The sample to be tested is prepared in the same manner described immediately above. However, in this test, the material is held vertically and a propane torch is brought into direct contact with the bottom of the material for between 10-20 seconds, or just enough to produce a flame on the stock. Any substrate/material drip due to burning is then observed. The coating passes this dripping test if dripping is observed only over the first one to two inches of the substrate. In certain embodiments, no drips will be observed.

Other standardized tests are available for determining other qualities of coating systems in accordance with the present invention. ASTM E84, incorporated by reference herein, outlines a procedure for determining flame spread rating and smoke development index. When a substrate, such as wallpaper stock, is coated with at least a 0.5 mil thick layer of the coating system and cured, the coated wallpaper stock when tested according to ASTM E84 exhibits a flame spread rating of less than 25 and a smoke development index of less than 50.

NFPA 286, incorporated by reference herein, is a standard designed to evaluate the flammability characteristics of wall or wall covering finish. When a substrate, such as wallpaper stock is coated with at least a 0.5 mil thick layer of the coating system and cured, the flammability characteristics when tested according to NFPA 286 are as follows: during 40 kW exposure the flames do not spread to the test chamber ceiling; during 160 kW exposure the flames shall not spread to the outer extremity of the sample and there is no flashover; the peak rate of heat released throughout the test shall not exceed 800 kW; and the total smoke released throughout the test shall not exceed 1000 m².

In certain embodiments of the present invention, the coating compositions also exhibit excellent resistance to a variety of aggressive solvents and chemicals such as acetone, paint thinners, alcohols, and acids. Specifically, the coating composition can be tested in accordance with ASTM D5402, incorporated by reference herein, and withstand at least 10, or even at least 50, rubs with a cloth or wad of cotton soaked with acetone without showing visible signs of the coating being removed from the substrate.

Certain embodiments of the present invention also exhibit good shelf stability in that the coating composition remains substantially homogenous over an extended period of time, or if settling does occur, the components can be readily re-dispersed through simple agitation of the container in which the coating is stored. Generally, the coating composition remains shelf stable for at least 6 months when stored at 25° C.

In particular embodiments, the coating composition may be applied to flexible sheets or films such as those used as wall coverings (e.g., wallpaper). In certain embodiments, the coating composition is a clear coat that can be applied over an image that previously has been printed upon the surface of a substrate.

The coating compositions can be applied to the target substrate by any number of methods known to those of skill in the art including screen printing, roller coating, curtain coating, and flexographic printing methods.

In the event that the substrate to which the coating is applied is exposed to a flame which would result in formation of some char on the surface, in many instances, the char can be removed and the printed image underneath remains undamaged.

The following table provides ranges for certain components present in particular coating formulations in accordance with one embodiment of the present invention.

| Component | Broad range (wt. %) | Intermediate range (wt. %) | Narrow range (wt. %) |
| --- | --- | --- | --- |
| Urethane resin | 3-30% | 5-25% | 7-20% |
| Monofunctional monomer | 10-35% | 12-30% | 15-25% |
| Multifunctional monomer | 5-25% | 7-20% | 10-18% |
| Reactive diluent | 5-25% | 7-20% | 10-18% |
| Fire retardant agent | 10-50% | 15-40% | 20-30% |
| Antimicrobial agent | 0.01-5% | 0.05-3% | 0.1-2% |
| Photoinitiator | 1-15% | 3-12% | 4-8% |
| Acrylic resin | 0-20% | 0.5-15% | 1-5% |

The following examples set forth exemplary coating formulations in accordance with the present invention. It is to be understood, however, that these examples are provided by way of illustration and nothing therein should be taken as a limitation upon the overall scope of the invention.

Example 1

| | Amount (% by weight) | |
| --- | --- | --- |
| Component | Formula 1 | Formula 2 |
| CN 991 (aliphatic urethane resin, from Sartomer) | 14% | 12.25-13.75% |
| Dipropylene glycol diacrylate (DPGDA, from Sartomer) | 12% | 9.35% |
| Vinyl pyrrolidone (vinyl ester, from ISP Corporation) | 12% | 15.25% |

-continued

| Component | Amount (% by weight) | |
|---|---|---|
| | Formula 1 | Formula 2 |
| Isobornyl Acrylate (IBOA, SR506A from Sartomer) | 24.24% | 17% |
| Stabilizer (75:25 blend of vinyl pyrrolidone:hydroqunione monomethyl ether (MEHQ)) | 1% | 1% |
| Methyl methacrylate resin (MB 2823 from Dianal) | 3% | 1.9 |
| Crosslinkable surface agent (TEGO 2250/TEGO450*) | 1.5% | 1.5%* |
| Photoinitiator (ESACURE 1 from Lamberti) | 1.75% | 1.75% |
| Photoinitiator 2,4,6 Trimethylbenzoyl diphenyl phosphine oxide (TPO from BASF) | 2% | 2% |
| Photoinitiator 1-hydroxycyclohexyl phenyl ketone (Irgacure-184 from BASF) | 3% | 3% |
| Fire retardant additive (CEASEFIRE AC3W from Cote-L Industries) | 25% | 25% |
| Antimicrobial additive (IONPURE) | 0.5% | 0.5% |
| Silica-based flatting agent (EVONIK EXP 3600) | — | 2.5% |
| Solvent (Propylene Glycol Monomethyl Ether Acetate) | — | 5% |
| Fumed silica (DEGUSSA R-202) | — | 0.5-1.5% |

Example 2

| Component | Amount (% by weight) |
|---|---|
| CN 991 (aliphatic urethane resin, from Sartomer) | 9.52% |
| Dipropylene glycol diacrylate (DPGDA, from Sartomer) | 11.43% |
| Vinyl pyrrolidone (vinyl ester, from ISP Corporation) | 15.24% |
| Isobornyl Acrylate (IBOA, SR506A from Sartomer) | 18.71% |
| Stabilizer (75:25 blend of vinyl pyrrolidone:hydroquinone monomethyl ether (MEHQ)) | 0.95% |
| Modified methyl methacrylate/butyl methacrylate resin (B-890 from DSM Neoresins) | 1.9% |
| Crosslinkable surface agent (TEGO 2250) | 1.43% |
| Solvent (PM Acetate, Barton Chemical) | 4.76% |
| Photoinitiator (ESACURE 1 from Lamberti) | 1.75% |
| Photoinitiator 2,4,6 Trimethylbenzoyl diphenyl phosphine oxide (TPO from BASF) | 2% |
| Photoinitiator 1-hydroxycyclohexyl phenyl ketone (Irgacure-184 from BASF) | 3% |
| Fire retardant additive (CEASEFIRE AC3W from Cote-L Industries) | 25% |
| Antimicrobial additive (IONPURE) | 0.5% |
| Treated silica (flatting agent, EXP 3600 from Evonik) | 3.81% |

Example 3

| Component | Amount (% by weight) |
|---|---|
| CN 991 (aliphatic urethane resin, from Sartomer) | 19% |
| Alkoxylated aliphatic diacrylate (SR 9209A, from Sartomer) | 13% |
| Vinyl pyrrolidone (vinyl ester, from ISP Corporation) | 13% |
| Isobornyl Acrylate (IBOA, SR506A from Sartomer) | 20.25% |
| Stabilizer (75:25 blend of vinyl pyrrolidone:hydroqunione monomethyl ether (MEHQ)) | 1% |
| Slip agent (TEGO 450) | 1.5% |
| Photoinitiator (ESACURE 1 from Lamberti) | 1.75% |
| Photoinitiator 2,4,6 Trimethylbenzoyl diphenyl phosphine oxide (TPO from BASF) | 2% |
| Photoinitiator 1-hydroxycyclohexyl phenyl ketone (Irgacure-184 from BASF) | 2% |
| Fire retardant additive (CEASEFIRE AC3W from Cote-L Industries) | 25% |
| Antimicrobial additive (IONPURE) | 0.5% |

Example 4—Chemical Resistance Tests

The coating composition from Example 2 was applied to swatches of wallpaper at a thickness of about 0.5 mil using a #2 bar on a K-Coater and cured by exposure to UV light. The cured coating was tested with a number of solvents, staining agents such as "permanent" ink and paint, and cleaning agents. The nature of these tests are discussed in greater detail below. In all instances, the coating composition withstood the challenge and was not degraded.

In the first set of challenges, both acetone and 70% isopropyl alcohol were applied using a cotton ball and rubbed across the coating 50 times. No visible degradation of the coating was observed.

In the next set of challenges, both gasoline and WINDEX (ammonia-containing glass cleaner) were spot-applied to the coating and permitted to stand thereon for 20 minutes. After 20 minutes, the liquid was removed and the coating inspected. Again, no visible degradation of the coating was observed.

In the next set of challenges, the coating was stained with blue, black, silver, green, and yellow SHARPIE brand magic markers, spray paint, mustard, and ketchup. After a 20-minute spot test, the staining agents were removed using acetone, CHIMISTA GCL-1500 Graffiti cleaner, and CHIMISTA AQUASTRIP-100. No visible degradation of the coating was observed following removal of the staining agent. This test was also repeated for the SHARPIE markers and spray paint, only the agent was allowed to stand for 24 hours prior to removal. Again, no visible degradation of the coating was observed.

I claim:
1. A protective coating composition comprising:
from 3 wt. % to 30 wt. % of one or more urethane resins;
from 10 wt. % to 35 wt. % of one or more monofunctional acrylate monomers;
from 5 wt. % to 25 wt. % of one or more multifunctional monomers;

from 5 wt. % to 25 wt. % of a vinyl-based reactive diluent monomer;

from 10 wt. % to 50 wt. % of a fire-retardant additive; and from 0.01 wt. % to 5 wt. % of an antimicrobial agent, said composition having a viscosity of about 200 to about 400 cps, measured at 25° C. using a Brookfield viscometer.

2. The composition according to claim 1, wherein said one or more urethane resins are selected from the group consisting of polyester-based aliphatic urethane resins, aliphatic urethane resins, aromatic urethane resins, acrylic-based urethane resins, urethane acrylate resins, and epoxy-based urethane resins.

3. The composition according to claim 1, wherein said one or more multifunctional monomers comprises a difunctional acrylate monomer.

4. The composition according to claim 1, wherein said fire-retardant additive comprises a phosphate-based flame retardant.

5. The composition according to claim 1, wherein said fire-retardant additive is non-halogenated.

6. The composition according to claim 1, wherein said antimicrobial agent comprises silver or silver ions.

7. The composition according to claim 1, wherein said composition is UN-curable and comprises a photoinitiator.

8. The composition according to claim 1, wherein said composition when applied to and cured upon a surface of a textile or film at a coating thickness of at least 0.5 mil protects said surface such that when exposed to an open flame according to NFPA 701 produces an after flame duration of less than 2.0 seconds and/or a char length of less than 6.5 in.

9. The composition according to claim 1, wherein said composition when applied to and cured upon a surface of a substrate at a coating thickness of at least 0.5 mil is capable of at least 3-log reduction of *K. pneumoniae* Methicillin Resistant *S. aureus* (MRSA), *Clostridium difficile, S. epidermidis, A. baumannii, C. albicans, E. coli, P. aeruginosa, S. aureus, Enterococcus* spp. (e.g., Vancomycin Resistant *Enterococcus faecalis* (VRE)), *Candida* spp., and CoNS according to Japanese Industrial Standard (JIS) Z 2801.

10. The composition according to claim 1, wherein said composition when applied to and cured upon a surface of a substrate at a coating thickness of at least 0.5 mil is capable of withstanding at least 50 rubs with acetone-soaked cotton.

11. An article having at least a portion of the outer surface thereof coated with the protective coating composition according to claim 1.

12. The article according to claim 11, wherein said article is wallpaper.

13. The article according to claim 11, wherein said article outer surface comprises an ink image imprinted thereon.

14. The article according to claim 11, wherein said article comprises a synthetic resin material or a coated board stock material.

15. A method of forming a protective coating on an article comprising the steps of:

applying to at least a portion of the surface of said article the coating composition according to claim 1; and curing said coating composition on said surface to form a protective layer thereon.

16. The method according to claim 15, wherein said method comprises printing an image onto said surface prior to applying said coating composition thereto.

17. The method according to claim 15, wherein said step of applying said coating to said surface comprises screen printing; roller coating, or curtain coating said coating composition onto said surface.

18. The method according to claim 15, wherein said step of curing said coating composition comprises exposing said coating composition to a source of UV light.

19. The composition according to claim 1, wherein said composition is a clear composition.

* * * * *